United States Patent [19]

Imamura et al.

[11] 3,922,651

[45] Nov. 25, 1975

[54] MEMORY DEVICE USING FERROMAGNETIC SUBSTANCE LINES

[75] Inventors: Nobutake Imamura, Tokyo; Toshihiko Kobayashi, Mitaka, both of Japan

[73] Assignee: Kokusai Denshin Denwa Kabushiki Kaisha, Japan

[22] Filed: Oct. 25, 1973

[21] Appl. No.: 409,743

[30] Foreign Application Priority Data

Oct. 26, 1972 Japan .............................. 47-106685

[52] U.S. Cl. .................... 340/174 TF; 340/174 QB; 340/174 BC

[51] Int. Cl.[2] ........................................ G11C 11/14

[58] Field of Search . 340/174 QB, 174 BC, 174 TF, 340/174 PW

[56] References Cited

UNITED STATES PATENTS

| | | | |
|---|---|---|---|
| 3,069,661 | 12/1962 | Gianola | 340/174 TW |
| 3,366,938 | 1/1968 | Matsushita | 340/174 PW |
| 3,370,979 | 2/1968 | Schmeckenbecher | 340/174 QB |
| 3,434,125 | 3/1969 | Baldwin, Jr. et al. | 340/174 QB |
| 3,438,006 | 4/1969 | Spain | 340/174 QB |
| 3,451,793 | 6/1969 | Matsushita | 340/174 QB |
| 3,521,252 | 7/1970 | Oshima et al. | 340/174 PW |
| 3,553,660 | 1/1971 | Wolf | 340/174 QB |
| 3,585,616 | 6/1971 | Mazzeo | 340/174 QB |

*Primary Examiner*—Stanley M. Urynowicz, Jr.
*Attorney, Agent, or Firm*—Robert E. Burns; Emmanuel J. Lobato; Bruce L. Adams

[57] ABSTRACT

A word-selection memory device using a ferromagnetic substance comprising a plurality of nonmagnetic lines arranged in parallel to one another and a plurality of memory lines each including a ferro-magnetic substance and orthogonally arranged with the nonmagnetic lines, in which each of the memory lines is only formed from a conductive, ferromagnetic substance having an axial easy magnetization axis.

6 Claims, 20 Drawing Figures

PRIOR ART

MEMORY DEVICE USING FERROMAGNETIC SUBSTANCE LINES

This invention relates to a memory device using a ferromagnetic substance.

In conventional devices of the type, each memory element is usually excited by applying an orthogonal magnetic field to the ferromagnetic thin film thereof having uniaxial anisotropy to perform the writing operation and the readout operation.

An object of this invention is to provide a memory device using a ferromagnetic substance which is operable in accordance with an operating principle different from the conventional art and which is readily fabricatable at low costs.

In accordance with this invention there is proposed a word-selection memory device using a ferromagnetic substance comprising a plurality of nonmagnetic lines arranged in parallel to one another and a plurality of memory lines each including a ferromagnetic substance and orthogonally arranged with the nonmagnetic lines, and in which each of the memory lines is only formed from a conductive, ferromagnetic substance having an axial easy magnetization axis.

The principle, construction and operations of this invention will be clearly understood from the following detailed description taken in conjunction with the accompanying drawings, in which.

Figure 1:
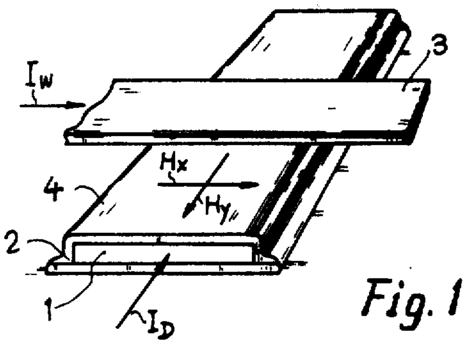
FIG. 1 is a schematic view illustrating the construction of a conventional memory device.
Figure 2A:
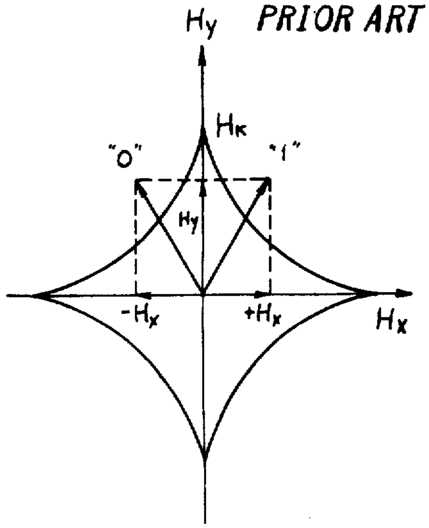
FIGS. 2A and 2B are characteristic diagrams explanatory of the characteristics of the conventional memory device.

In order to more readily understanding the differences between conventional arts and this invention, an example of the conventional devices will first be described. This example of a conventional device comprises, as shown in FIG. 1, a magnetic line 4 defining a digit line composed of a nonmagnetic conductor 1 (e.g. copper) coated with at least one ferromagnetic thin film 2 by electroplating or evaporative deposition, and a nonmagnetic conductor 3 defining a word line orthogonally intersected with the digit line, thereby to form a memory cell at the intersection therebetween. Accordingly, the memory cell is excited by an external magnetic field Hx caused by current $I_D$ flowing through the digit line 4 (i.e. a magnetic field generated from the conductor except the ferromagnetic thin film and applied to the ferromagnetic thin film) and an external magnetic field Hy caused by a current $I_W$ flowing through the word line 3. The magnetic reversal of the ferromagnetic film under these external orthogonal magnetic fields can be illustrated as a critical magnetic curve for magnetization reversal on external co-ordinates (Hx, Hy) as shown in FIG. 2A. In case of writing, the memory cell is established to the state 1 or 0 by the superimposition of the magnetic field Hy of the word current $I_W$ and the magnetic field Hx of the digit current $I_D$. Namely, if the magnetic fields Hy and Hx are simultaneously applied to the memory cell as shown in FIG. 1, the magnetization vector of the memory cell assumes the state 1 in FIG. 2A so that the state 1 is stored when the magnetic fields are removed. If the magnetic fields Hy and -Hx are simultaneously applied thereto, the magnetization vector of the memory cell assumes the state 0 in FIG. 2A so that the state 0 is stored when the magnetic fields are removed. In case of reading out, since a voltage induced in the digit line 4 assumes reverse polarities for the state 1 and the state 0 in response to the application of the magnetic field Hy only, the state 1 and the state 0 can be detected.

Figure 2B:
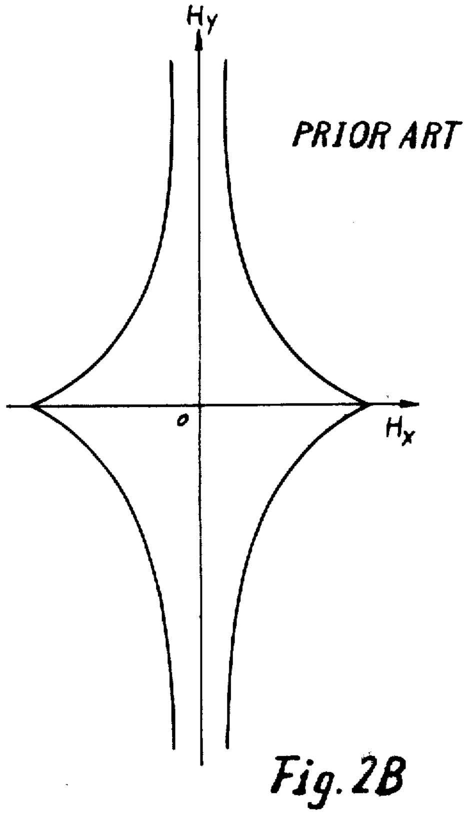

In the above example, the pattern form of the critical curve for magnetization reversal is substantially constant unless the ferromagnetic thin film 2 is a single layer film. More particularly, the entire pattern thereof changes relatively in accordance with the magnitude of the magnetic anisotropy field Hk, while intersection points with the axis Hx are slightly deviated in accordance with the value of the coercive force Hc. Moreover, since the critical magnetic field curve intersects with the axis Hy at the point Hk, the stored state of the memory cell is destructed if a magnetic field larger than the value Hk. Accordingly, while the memory cell requires a ferromagnetic thin film having a magnetic characteristic as uniform as possible, it is very difficult to provide such uniform magnetic characteristic due to fluctuation of the magnitude of the magnetic anisotropy and the angular dispersion thereof. As mentioned above, the above example is insufficient as a practical nondestructive memory cell, in which the writing operation is readily performed and the readout is still nondestructive. To improve the above defects, a composite film including multilayers of different magnetic anisotropy fields was proposed to avoid intersection of the critical magnetic curve for magnetization reversal with the axis Hy as shown in FIG. 2B. However, the composite film has such defects as increasing the number of fabricating steps and lowering of uniformity of the magnetic characteristic.

The above defects of conventional arts can be effectively eliminated in accordance with this invention as described below.

Figure 3A:
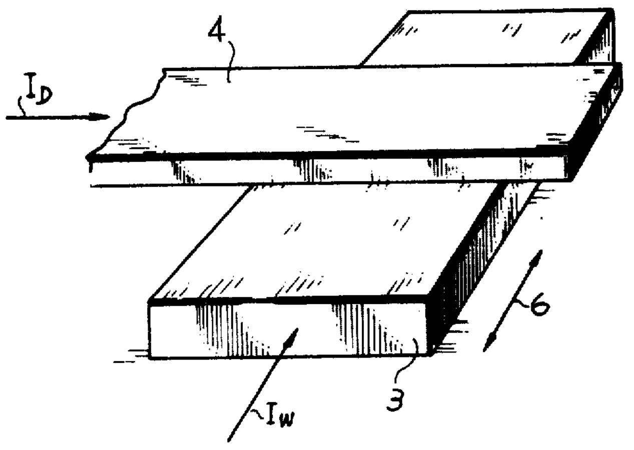
FIGS. 3A and 3B are perspective views each illustrating a basic construction of the memory device of the present invention.
Figure 3B:
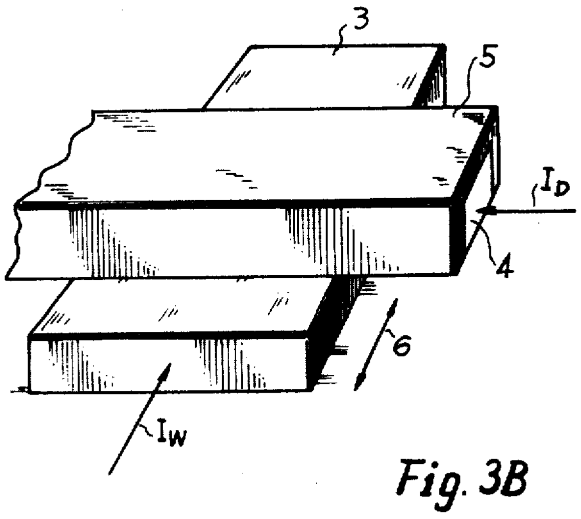
Figure 4:
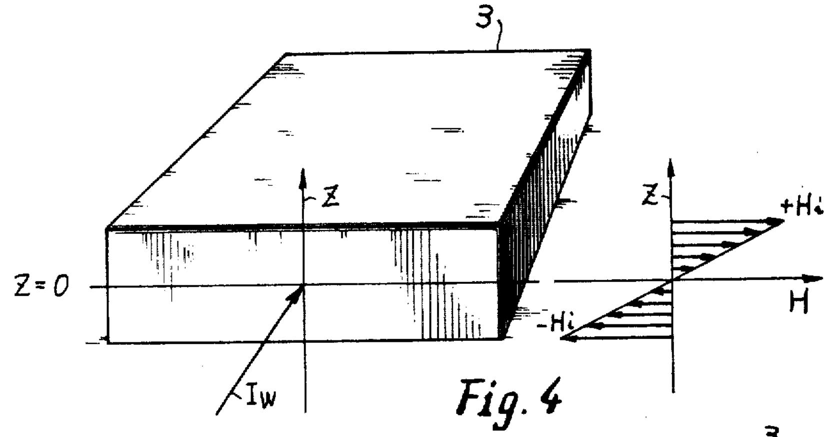
FIGS. 4, 5A, 5B, 5C and 5D are perspective views explanatory of the operation principle of this invention.

An example of a memory cell formed in accordance with this invention comprises a word line 3 formed by conductive ferromagnetic substance only, such as permalloy, and a digit line 1 of nonmagnetic conductor, such as copper, gold or silver as shown in FIG. 3A. In order to raise the bit density thereof as high as possible, a magnetic flux keeper 5 of magnetic film may be coated around the digit line 1 except the portion opposed to the word line 3 as shown in FIG. 3B. The word line 3 is a slender line composed of only a ferromagnetic substance (hereinafter refered to as a magnetic substance line), whose easy magnetization axis 6 is established in the axial direction by the heat treatment in a desired magnetic field, by evaporative deposition in a desired magnetic field, by electroploting in a desired magnetic field, or by utilizing shape anisotropy. Since the word current $I_W$ flows through the internal part of the magnetic substance line 3, an internal magnetic field $H_i$ caused by the current $I_w$ (i.e. a magnetic field generated by the ferromagnetic substance itself and applied to the same ferromagnetic substance itself) is directed reversely at the upper part and the lower part of the magnetic substance line 3 as shown in FIG. 4. Accordingly, the spin twisting structure is provided in which the internal magnetic field $H_i$ decreases towards the central portion and becomes zero at the intermediate point. The magnetic substance line 3 has a rectangular section.

Figures 5A, 5B:
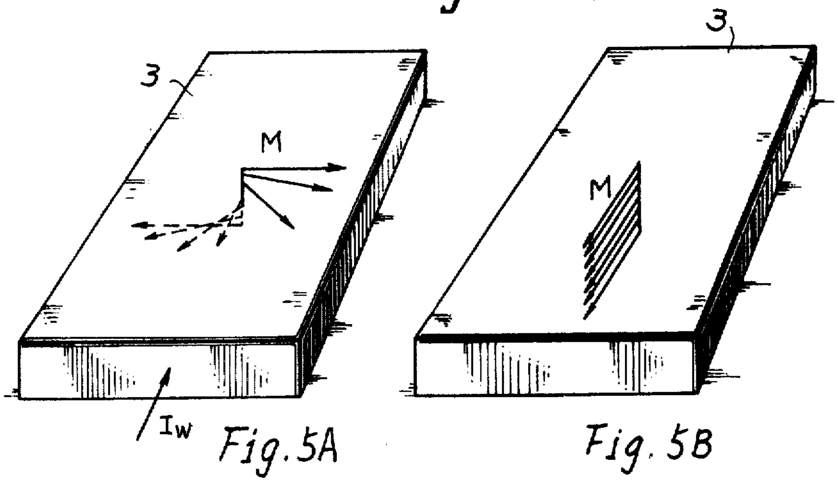
Figure 5C:
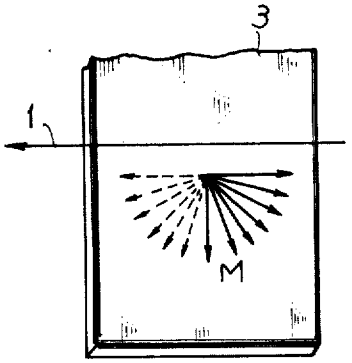
Figure 5D:
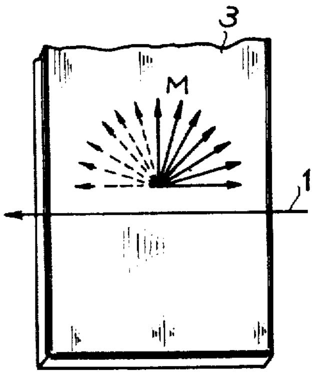
Figure 5E:
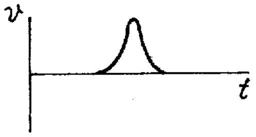
FIGS. 5E and 5F are waveforms explanatory of the operation of this invention.
Figure 5F:
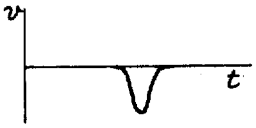

In a case where the current $I_w$ is not flowed in the magnetic line 3, the spin magnetic moments M are uniformly arranged as shown in FIG. 5B. If the current $I_w$ is flowed in the magnetic substance line 3, the magnetic field in the magnetic substance line 3 is directed in the opposite directions at the upper part and at the lower part with respect to a symmetrical axis or point of the center of the section, so that the magnetic moments M are twisted as shown in FIG. 5A to direct in the opposite directions at the upper part and at the lower part. The deviation direction of magnetization caused by this twist is determined as one of two reverse directions shown in FIGS. 5C and 5D in accordance with the direction of the magnetic moment M with respect to the digit line 1. Accordingly, since a voltage induced in the digit line 1 assumes opposite polarities as shown in FIGS. 5E and 5F in accordance with the two reverse directions, the stored states 1 and 0 can be detected with respect to each other.

Figure 6A:
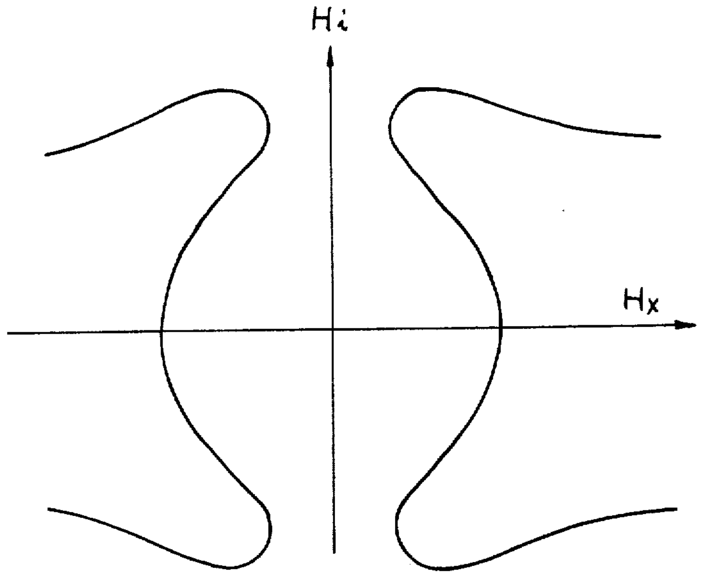
FIGS. 6A and 6B are characteristic curves each illustrating a critical magnetic field curve diagram for the memory device of this invention.
Figure 6B:
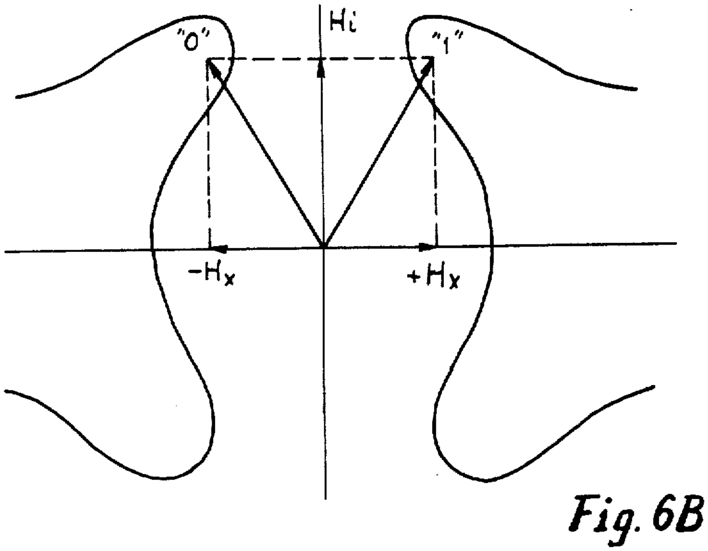

The critical magnetic field curve for magnetization reversal in the memory cell formed in accordance with this invention is not indicated on the above mentioned conventional external orthogonal magnetic field (Hx, Hy) co-ordinates but on internal orthogonal magnetic field (Hx, Hi) co-ordinates. In this case, the notation Hi is a representative magnetic field at the surface of the ferromagnetic substance line 3 imaginatively separated from an inside magnetic field deviated at the inside of the magnetic substance line 3. In other words, the inside magnetic field is imaginatively replaced by the representative magnetic field. The critical magnetic field curve for magnetization reversal on the co-ordinates (Hx, Hi) is as shown in FIG. 6A. The writing operations to the state 1 and the state 0 are performed as follows. If the internal magnetic field Hi caused by a current flowing through the word line 3 and the external magnetic field +Hx caused by a current flowing through the digit line 4 are simultaneously applied to the magnetic substance line 3, a magnetic field of 1 shown in FIG. 6B is generated thereby established to the state 1. If the internal magnetic field Hi and the external magnetic field −Hx are simultaneously applied to the magnetic substance line 3, the state 0 is established.

As mentioned above, the principle of this invention is characterized in that the external-internal orthogonal magnetic fields are employed in place of the external orthogonal magnetic fields under employment of ferromagnetic substance itself as the word line.

A thickness of about 1 micron order is necessary to realize the aforesaid spin twisting structure. A thickness of 5000 A to 2 microns may be actually used. The upper limit of the thickness is about 2 microns so as to avoid increases in the switching time and the eddy current loss. A minimum width of about 20 microns is necessary to avoid the stability of spin due to affection by a diamagnetizing field caused at the edge portion. A width of 20 to 200 microns may be actually used, but a width of 100 microns is suitable in view of resistance and efficiency. A maximum section area is appropriately determined for a desired switching time.

As mentioned above, since the ferromagnetic substance itself is employed as the word line, the critical magnetic field for magnetization reversal is as shown in FIG. 6A, in which the curves do not at all intersect with the axis Hi corresponding to the axis Hy in FIG. 2A. Accordingly, this completely meets with a sufficient requirement for a non-destructive memory in which stored information is not at all destructed in response to the read-out operation. In other words, an ideal memory line can be formed by only a ferromagnetic substance. Moreover, the critical magnetic characteristic can be adjusted by the sectional area (e.g. the thickness).

Figure 7A:
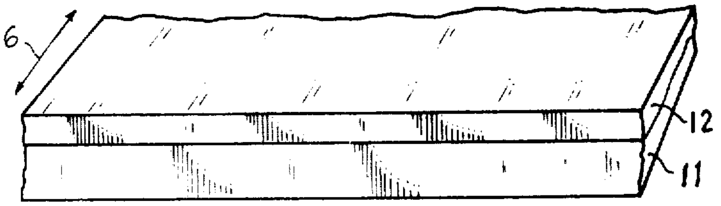
FIGS. 7A, 7B, 7C, 7D and 7E are perspective views explanatory of the fabrication process of the memory device of this invention.
Figure 7B:
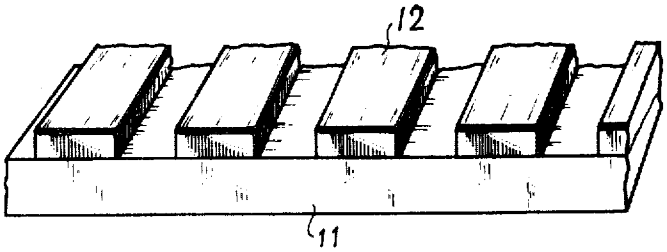
Figure 7C:
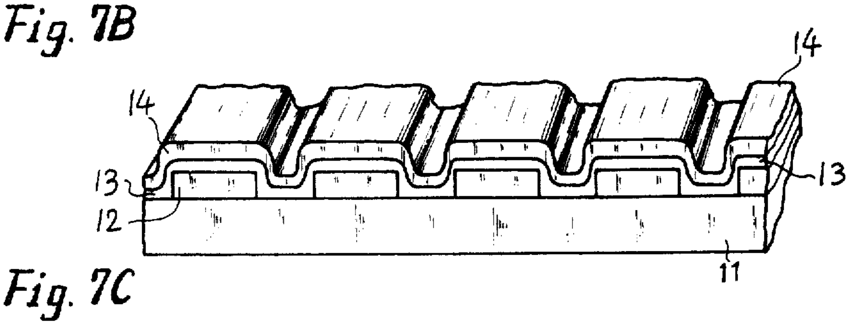
Figure 7D:
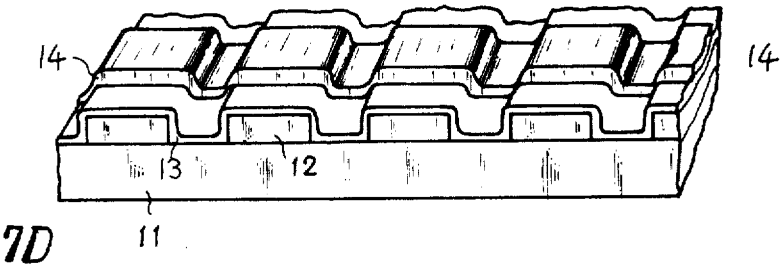
Figure 7E:
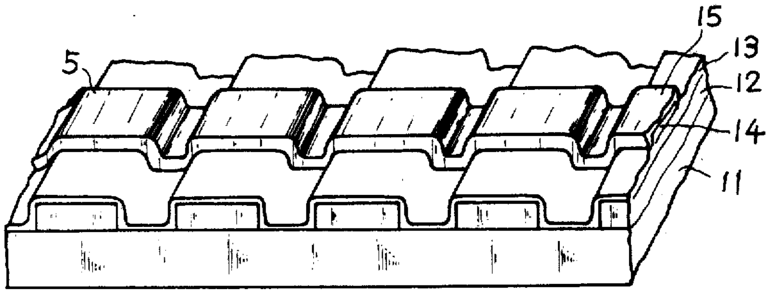
Figure 8:
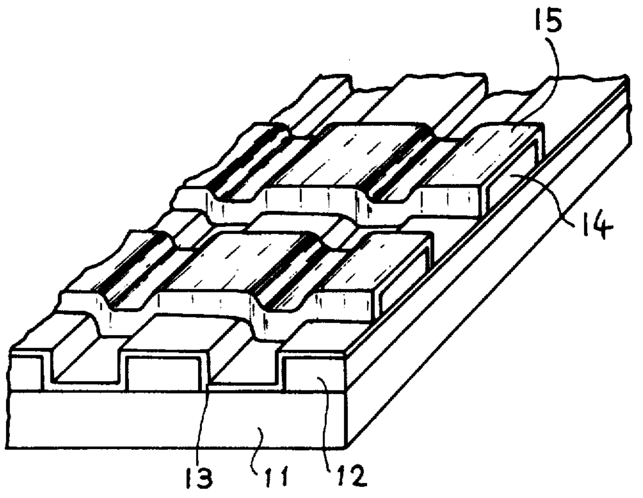
FIG. 8 is a perspective view illustrating an embodiment of this invention.

An array of the above mentioned memory cells can be fabricated as follows. At first, a ferromagnetic substance 12 is deposited by evaporative deposition or plasma radiation on an insulating substrate such as a glass plate or a mylar plate as shown in FIG. 7A. A magnetic foil may be adhered on the substrate 11. The easy magnetization axis 6 is established in a desired direction by the deposition or a later heat treatment under a magnetic field of the desired direction. Next, a plurality of magnetic stripes 12 arranged in parallel to one another are provided as shown in FIG. 7B by photo-etching the ferromagnetic substance 12. An insulating layer 13, such as SiO, and a nonmagnetic conductor layer 14 (e.g. copper, silver or gold) are successively deposited or adhered in the magnetic strips 12 as shown in FIG. 7C. The nonmagnetic conductor layer 14 is photoetched as shown in FIG. 7D to provide a plurality of conductor stripes 14 perpendicularly intersected with the ferromagnetic stripes 12. At last, a ferromagnetic layer 15 is deposited or adhered on each conductor stripe 14 as a magnetic flux keeper as shown in FIG. 7E. A perspective view of thus fabricated memory device is illustrated in FIG. 8.

As mentioned above, a nondestructive memory array of high bit density can be readily fabricated in accordance with this invention. Since the ferromagnetic substance line has a specific resistance larger than conductive material, such as copper, silver or gold, its too long length is to be avoided. However, if the device is made in a high bit density using a short length of the ferromagnetic lines 12 of word line, the above difficulty can be avoided. Therefore, this invention is useful to fabricate a miniaturized matrix memory device of high bit density at low costs.

What we claim is:

1. A word-selection memory device using a ferromagnetic substance, comprising:

a plurality of nonmagnetic lines of rectangular section arranged in parallel to one another; and a plurality of memory lines of rectangular section orthogonally arranged with respect to said nonmagnetic lines and composed only from a conducting, ferromagnetic substance having an axial easy magnetization axis, the thickness of each of said memory lines being within a range of 5000A to 2 microns.

2. A word-selection memory device according to claim 1, further comprising magnetic flux keepers of magnetic films deposited on respective ones of said nonmagnetic lines except the portions thereof opposed to said magnetic lines.

3. A word-selection memory device according to claim 1, in which the width of each of said memory lines is within a range of 20 to 200 microns.

4. In a memory device of the type which stores binary information and performs non-destructive read-out in response to pulse signals applied thereto: means defining a plurality of nonmagnetic lines disposed parallel to one another, each nonmagnetic line having a generally rectangular cross-section and being composed of nonmagnetic, electrically conductive material; and means defining a plurality of magnetic lines disposed parallel to one another and orthogonal to said nonmagnetic lines, each magnetic line having a generally rectangular cross-section with a thickness within the range of 5000A to 2 microns and being composed solely of ferromagnetic, electrically conductive material and having an axial easy magnetization axis; said magnetic lines being positioned with respect to said nonmagnetic lines such that each intersection of two lines has one of two stable magnetizations which are located at 0° and 180° relative to the axis of said magnetic lines.

5. A memory device according to claim 4; further comprising magnetic flux keepers of magnetic films deposited on respective ones of said magnetic lines except the portions thereof opposed to said magnetic lines.

6. A memory device according to claim 4; wherein said magnetic lines have a width within the range of 20 to 200 microns.

* * * * *